United States Patent [19]

Gusching et al.

[11] 4,122,597
[45] Oct. 31, 1978

[54] TOOL UTILIZATION MECHANISM

[75] Inventors: Nagle V. Gusching; Ralph E. Prescott, both of Sidney, Ohio

[73] Assignee: The Monarch Machine Tool Company, Sidney, Ohio

[21] Appl. No.: 792,783

[22] Filed: May 2, 1977

[51] Int. Cl.² .......................................... B23Q 3/157
[52] U.S. Cl. .................................................. 29/568
[58] Field of Search ........................... 29/568; 408/234

[56] References Cited

U.S. PATENT DOCUMENTS

| | | | |
|---|---|---|---|
| 3,300,856 | 1/1967 | Daugherty | 29/568 |
| 3,591,920 | 7/1971 | Brainard et al. | 29/568 |
| 3,775,837 | 12/1973 | Tomita et al. | 29/568 |
| 3,886,652 | 6/1975 | Roubloff et al. | 29/568 |

*Primary Examiner*—Gil Weidenfeld
*Attorney, Agent, or Firm*—Woodling, Krost, Granger & Rust

[57] ABSTRACT

A tool storage mechanism is disclosed wherein a tool storage magazine is mounted by a pivotal connection to a vertically movable tool slide. The tool slide also carries a horizontally movable tool slide carrying a rotatable tool for operating on a workpiece which moves in the third mutually perpendicular direction. The carried tool slide retracts to a tool change position whereat a tool changer will interchange a tool in the tool spindle with one in a socket of the tool storage magazine. Accordingly, the tool storage magazine moves up and down vertically with the first tool slide but has its own second drive means separate from the first drive means of the first slide. This second drive means is close to the nominal center of mass of the tool storage magazine but this center of mass changes as the magazine moves to present selected tools to the tool changer. The second drive means supports almost all of the weight of the tool storage magazine so that only a minor portion of the weight is transmitted through the pivotal connection to the first slide and hence the deflection of the tool tip from its desired position, as the tool storage magazine is moved, is greatly minimized. The foregoing abstract is merely a resume of one general application, is not a complete discussion of all principles of operation or applications, and is not to be construed as a limitation on the scope of the claimed subject matter.

17 Claims, 5 Drawing Figures

TOOL UTILIZATION MECHANISM

BACKGROUND OF THE INVENTION

Numerically controlled machine tools used preset tools carried in a tool storage magazine and a tool changer interchanges these tools as desired with the previously used tool in the tool spindle. Due to the numerical control the machine runs almost automatically with a minimum amount of supervision. The number of tools for use in the machine tool has gradually increased over the years in order to provide greater flexibility of machining capabilities to the machine tool. In some machine tools the tool changer had to be retracted in two different dimensions to a relatively stationary tool storage magazine before a tool interchange could be effected. This wasted considerable time during the total machining cycle.

A number of machine tools required that the operating spindle retract in only a single dimensional path to a tool interchange position. Where the operating spindle moved in two dimensions, this presented difficulty that the tool storage magazine had to move in one of those two dimensions so as to be available for the tool change function. When only 15 to 20 tools, for example, were used, the weight of the tool storage magazine was not significant. As the number of tools increased to 40 or 50 tools, for example, two factors rapidly increased, namely both the total weight of the tool magazine and the fact that the length of the tool magazine usually meant considerable rear overhang thereof. When the machine tool was attempted to be used with only about half of the tool sockets in the magazine occupied, this could cause a large unbalance condition to exist during movement of the magazine. At some times the weight could all be on the front of the magazine and at other times all on the rear. This would cause large changes in the moment on the support for the tool magazine which caused an undesirable deflection in the position of the tip of the tool in the operating spindle. This destroyed the machining accuracy of the machine tool.

Some prior art machine tools utilized counterbalances of either the weight type or fluid pressure type to attempt to eliminate this changing problem. Other machine tool manufacturers ignored the problem and made no provisions for the deflection caused by the change of moment.

Accordingly, the problem to be solved is how to accommodate the shifting weight of a moving tool storage magazine so that this shifting weight and concomitant change of moment does not materially affect the accuracy of the machine tool.

SUMMARY OF THE INVENTION

The problem is solved by utilizing a machine tool having a slide vertically movable on a base and power means connected through a first drive means to move the slide, the provision of a tool utilization mechanism comprising, in combination, a tool storage magazine, second drive means connected between said power means and said tool storage magazine to move said tool storage magazine in a vertical direction, and said second drive means including means to effect vertical movement of said magazine substantially in accordance with the vertical movement of the slide.

An object of the invention is to provide a machine tool which provides a separate drive means for a tool storage magazine to support the weight thereof generally along the center of mass so as to not materially affect the accuracy of the machine tool with which the magazine is used.

Another object of the invention is to provide a first drive means for a vertically movable slide and a second drive means for a vertically movable tool storage magazine with the second drive means moved in accordance with movement of the first drive means.

Other objects and a fuller understanding of the invention may be had by referring to the following description and claims, taken in conjunction with the accompanying drawing.

DESCRIPTION OF THE PREFERRED EMBODIMENT

Figure 1:
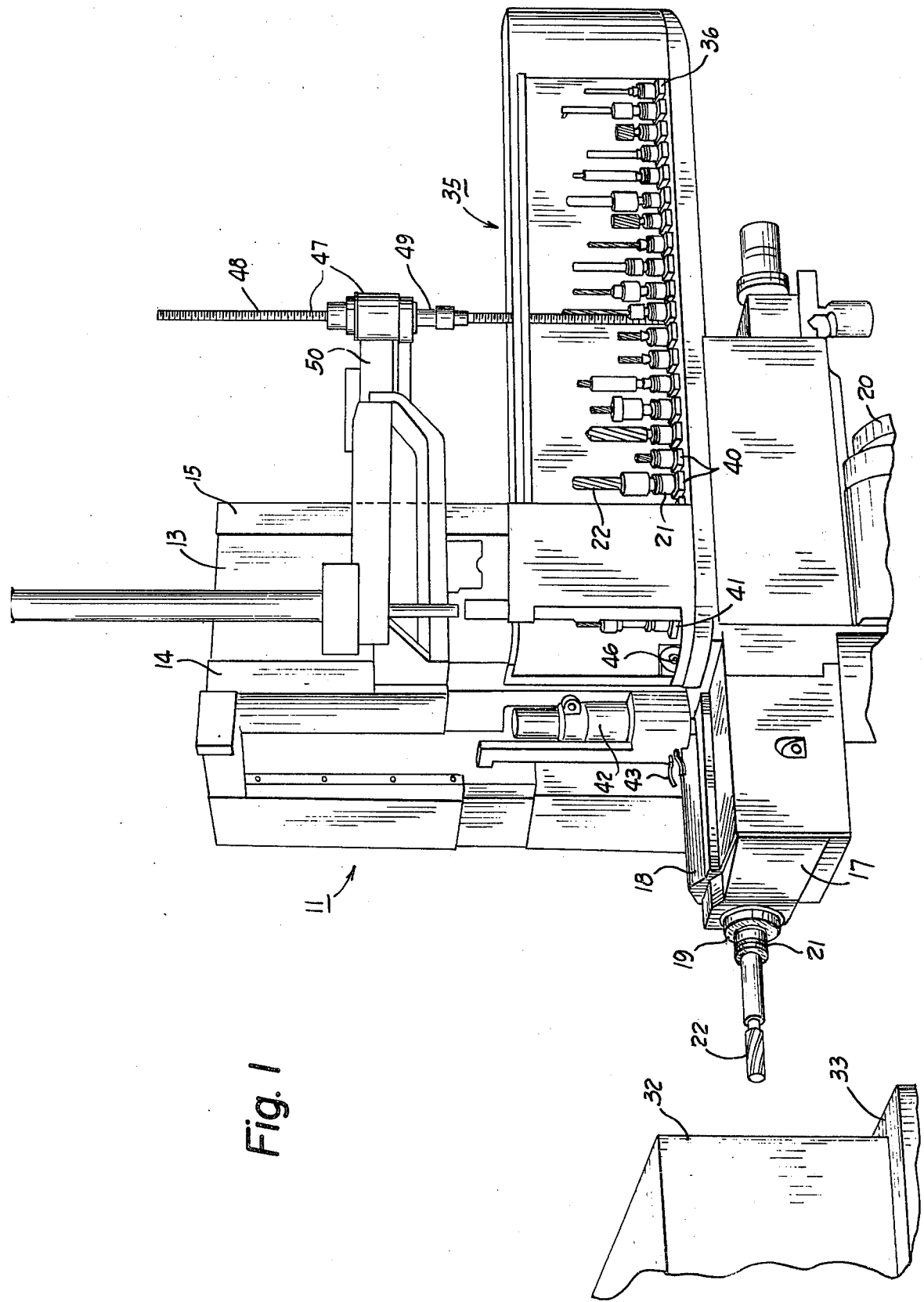
FIG. 1 is a perspective view of a machine tool embodying the invention.

The figures of the drawing illustrate a machine tool 11 which has a base 12 on which is fixed a vertically extending column 13. The column 13 has a first way 14 and a second way 15 for guiding the vertical movement of a first slide 16. This first slide 16 may be called a ram carrier slide which carries a ram 17 which is a slide moving on slide ways 18 on the first slide 16 for horizontal movement. The ram 17 carries a rotatable spindle 19 driven by a spindle motor 20. The spindle is adapted to carry interchangeable tool holders 21 each carrying different tools 22 such as drilling, reaming and milling tools.

Power means is provided to move the first slide 16 in a vertical path. This power means includes motor means 25 which is connected through a first drive means 26 to move the slide 16. This first drive means includes a screw and nut mechanism with the screw 27 being mounted vertically and supported at the top by a bearing 28 and also supported at the bottom by a bearing 29. Both bearings are carried on fixed parts of the machine tool. A nut 30 is preferably a ball nut with recirculating balls to cooperate with the screw 27 and this nut is carried in the first slide 16 for non-rotative yet axial movement in accordance with rotative yet non-axial movement of the screw 27. The nut 30 thus is the point of actuation on the slide 16 of the first drive means 26.

Due to the vertical movement of the slide 16 and the horizontal movement of the ram 17, the tool 22 has two mutually perpendicular directions of movement. This tool is thus positioned for cooperation with a workpiece 32 which may be secured on a table 33 guided for movement by ways, not shown, on the base 12 along a horizontal path which is mutually perpendicular to the two paths of movement of the tool 22. By this means machining in three dimensions is possible.

A tool utilization mechanism 35 is provided in the machine tool 11 and this mechanism 35 includes generally a tool storage magazine 36 and the way it is mounted and moved. The tool storage magazine is elongated and is illustrated as a chain type magazine having sprockets 37 and 38 engaged by a chain 39. The chain carries tool storage sockets 40 each with a conical shape to receive any one of the tool holders 21. The tool storage sockets 40 may be indexed so that a selected one may be presented to the front of the magazine 36 to a tool change position 41 whereat the tool storage sockets 40 are spread apart. A tool changer 42 is also a part of the tool utilization mechanism 35 and this tool changer 42 has a tool holder grasping claw 43 which may swing downwardly from the position shown in FIG. 1 to pivot closed to enter an annular groove in the tool holder 21 in the operating spindle 19, remove the tool holder from this spindle 19, swing around and move it into an empty tool storage socket at the tool change position 41. The claw 43 then releases the tool holder, the tool storage magazine 36 indexes to have the next selected tool at the tool change position 41, the claw 43 grasps it, removes the tool holder and places it in the operating spindle 19. This is effected with the ram 17 retracted from a forward position shown in FIG. 1 to the position of FIG. 2. The ram 17 would then move forwardly to machine the workpiece 32 with the new tool in the spindle 19.

The tool storage magazine 36 is mounted above and slightly outboard of the center line of the ram carrier or first slide 16. The magazine 36 has only a single connection to the slide 16 and this is at a pivotal connection 46 which is a point or location closely adjacent the tool change position 41. The tool changer 42 is also carried on the first slide 16 hence both tool changer 42 and the tool storage magazine 36 move vertically with this first slide 16.

Figure 2:
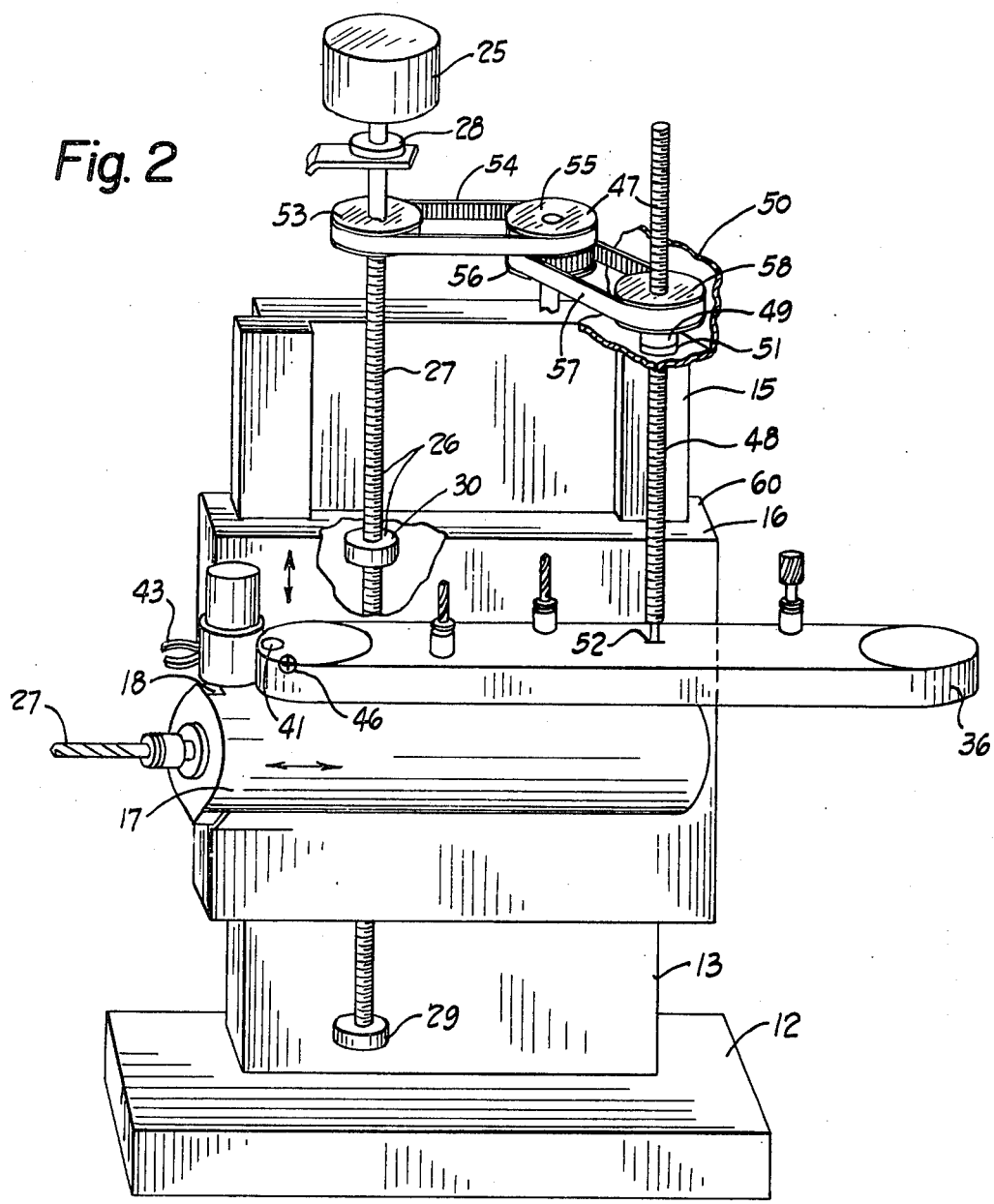
FIG. 2 is a rather schematic view similar to FIG. 1 and illustrating the main parts of the invention.
Figure 3:
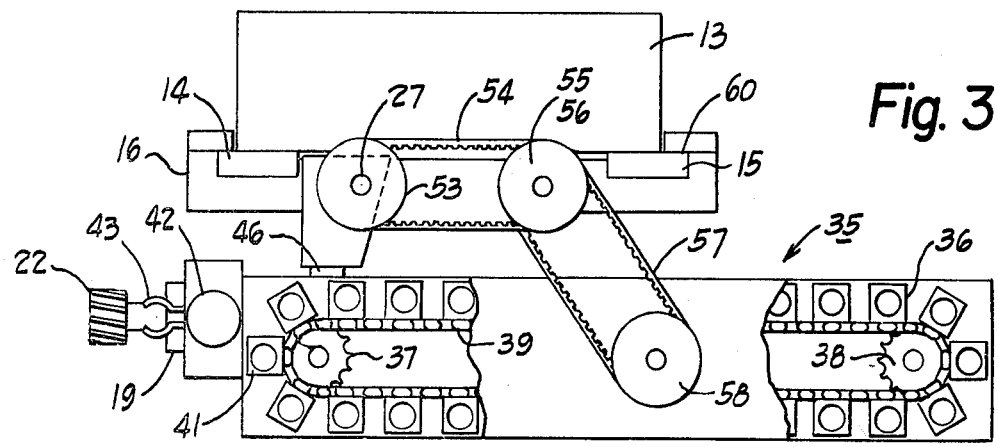
FIG. 3 is an enlarged plan view of the invention with some parts broken away.

The tool utilization mechanism 35 also includes second drive means 47 which is connected between the motor means 25 and the tool storage magazine 36 to move this magazine in a vertical direction. This second drive means 47 includes a screw and nut mechanism with a screw 48 and a nut 49 which preferably is a ball nut having recirculating balls for cooperation with the screw 48. The second drive means 47 also includes means to effect vertical movement of the magazine 36 in accordance with the vertical movement of the first slide 16. This includes a means to rotate the nut 49 directly in accordance with rotation of the screw 27. This means is better illustrated in FIGS. 2 and 3 as including toothed wheels and a chain or toothed belt. The toothed wheels in the preferred embodiment are toothed pulleys to cooperate with a toothed timing belt. The nut 49 is journaled for rotation in a support arm 50 fixed on the column 13. A bearing 51 journals this nut 49 relative to the support arm 50. The lower end of the screw 48 is connected to the tool storage magazine at one point, shown as a pivotal connection 52 pivoted about a horizontal axis to the tool storage magazine 36.

A toothed pulley 53 is secured to the screw 27 to rotate therewith and drives a toothed timing belt 54 which in turn drives an idler toothed pulley 55 connected to and rotating another idler toothed pulley 56 which drives a timing belt 57 engaging and driving a toothed pulley 58 coaxial with and fixed to the nut 49. Thus this interconnection of toothed pulleys and timing belts 53–58 accomplishes two purposes of being a timing means to rotate the pulley 58 at the same speed of rotation as the screw 27 and it is also the drive means to supply power from the motor 25 to raise and lower the tool storage magazine 36.

The pivotal connection 46 between the tool storage 36 and the first slide 16 permits slight vertical movements between the outboard end of the magazine 36 and slide 16. This is quite advantageous because the screw 27 and nut 30 preferably is a precision manufactured screw and ball nut whereas the screw 48 and nut 49 may be a non-precision manufactured unit. Accordingly, even though the two screw-nuts are rotated in unison, there might be as much as 1/16 of an inch difference in elevation of the pivot connection 52 relative to the nut 30 moving the slide 16, yet this will be only an insignificant longitudinal tilting of the tool storage magazine 36. Because the pivot 46 is closely adjacent the tool change position 41, this means that the selected tool holder 21 is precisely positioned within a few thousandths of an inch from its desired position so that the tool changer claw 43 will always be able to grasp and remove this selected tool holder.

The pivotal connection 52 between the screw 48 and the tool storage magazine 36 is approximately at the longitudinal center of this tool storage magazine. In the preferred embodiment this position is actually slightly to the rear of the longitudinal center as described below in connection with FIG. 5. This places the support of the tool storage magazine 36 substantially along the center of gravity of this magazine 36.

OPERATION

The tool utilization mechanism 35 of the present invention provides a means to make a considerably more accurate machine tool 11. The tool storage magazine 36 is one which moves vertically generally in accordance with the vertical movement of the slide 16. By this means it is always at a vertical level such that the tools may be changed by the tool changer 42 in a minimum of time. The ram 17 needs only to retract to its most rearward position to the right as viewed in FIG. 2 in order to have the tool changer 42 operate. Regardless of the vertical position of the slide 16, the tool storage magazine 36 is positioned for this tool interchange. This provides fast tool change and hence a minimum of time between cutting operations on the workpiece 32. Some prior art machines had the tool storage magazine in a more remote position so that the tool would need to retract along two different paths to reach the tool interchange position. This delayed the tool changing and increased the cycle time.

In order to achieve greater flexibility of the machine tool 11, in recent years it has been advantageous to increase the tool storage capacity of the storage magazine 36. As a result, it has grown longer in physical extent in order to hold first 20 tools then 30 and now 40 or even 50 tools. As a result, the magazine 36 has grown until it may be more than 6 feet in length. This results in a considerable rear overhang of this tool storage magazine. The weight of this tool storage magazine complete with the tool holders and tools may be considerable and even worse is the fact that the tools may be distributed unevenly so that as the chain is moved the shifting weight will affect the accuracy of the position of the tool 22.

Merely by way of example, 50 tools might weight in the order of 400 to 700 pounds together with their identical tool holders 21. Assuming a worst case, the magazine 36 which might accommodate 50 tools, for example, might have only 25 tools therein at a particular time for a particular machining operation. Again assuming a worst case if all of these 25 tools were placed in consecutive tool storage sockets 40, then there could be two exteme conditions of operation, one wherein all of the tools and tool holders were at the rearmost portion of the magazine 36, as shown schematically in FIG. 4, and the alternative case when all of the tool holders and tools were at the front end of the magazine, as shown in FIG. 5.

Figure 4:
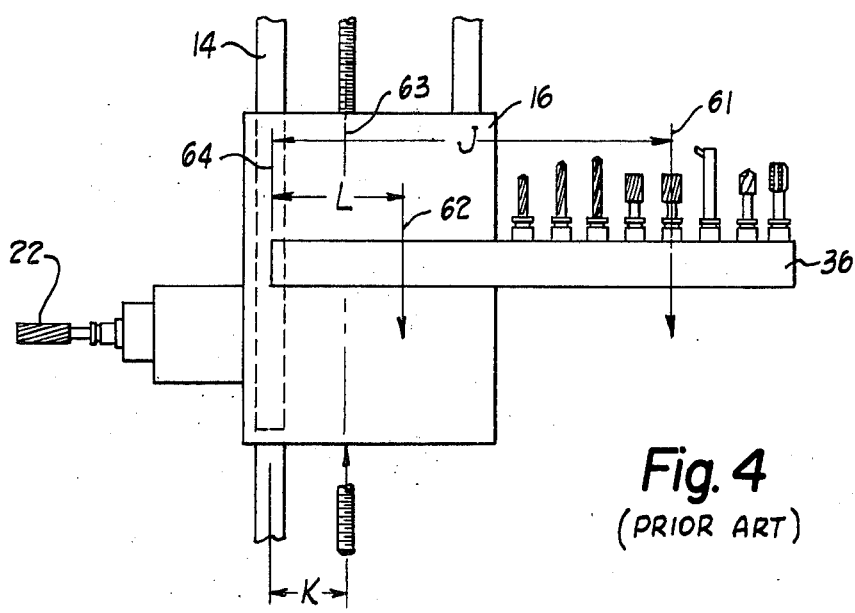
FIG. 4 is a schematic elevational view of a prior art mechanism showing the forces acting thereon.
Figure 5:
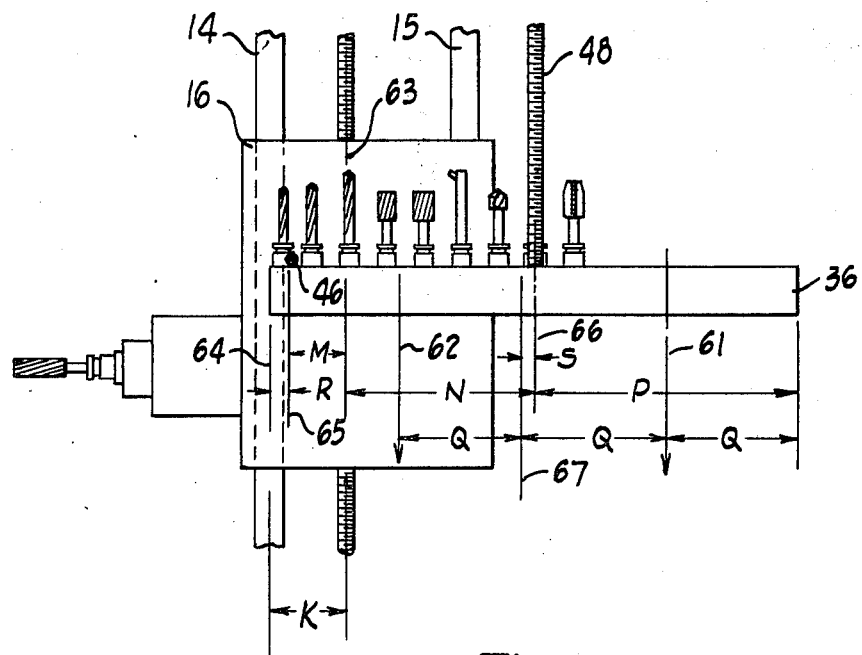
FIG. 5 is a schematic elevational view of the present invention illustrating the forces acting thereon.

Assuming a weight of 300 pounds for the 25 tools and tool holders which are consecutively positioned in the tool sockets 40, FIG. 4 illustrates the prior art arrangement of a machine tool having dimensions of an actual machine tool constructed generally as shown in FIG. 1. FIG. 4 shows the schematic representation of the machine tool prior to the incorporation in that machine tool of the present invention. This FIG. 4 prior art construction is one with the magazine 36 carried rigidly on the first slide 16.

Assume for illustration that the 25 tools are all at the rear of the tool storage magazine 36, and that the front way 14 is that which resists the forward and backward longitudinal tilting of the first slide 16. Way 15 in this particular example is not designed to resist the moment of forward and backward tilting of the slide 16, it is designed only to hold the slide against lateral tilting movements outwardly away from the column 13, due to the slide 16 having a way surface 60 wrapped around the rear of the way 15.

In FIG. 4 the reference line 61 indicates a vertical line through the center of mass of the rearwardly positioned 25 tools and tool holders. Vertical reference line 62 is through the center of mass of the tools when the chain has been moved so that all of the tools and tool holders are at the front of the magazine 36. Reference line 63 is in a vertical plane perpendicular to the slide 16 which passes through the screw 27 which imparts movement to this slide 16. Reference line 64 is the center line of way 14, the way which resists the forward and backward, relative to tool 22, tilting of the slide 16 due to changing weight on the tool storage magazine 36. The dimensions for an actual machine may be as follows: $J = 56.45$ inches $K = 7.25$ inches; and $L = 18.46$ inches.

Condition A: Where all of the tools are at the rear of the magazine with center of mass at reference line 61. The moment acting on the slide 16 tending to cause tilting thereof and resisted by the way 14 equals:

300 lbs. × 56.45 inches − 300 lbs. × 7.25 inches = 14,763 in.lb.

Condition B: With all 25 tools and tool holders at the front of the magazine 36 with center of mass at reference line 62:

300 lbs. × 18.46 inches − 300 lbs. × 7.25 inches = 3,363 in.lb.

The moment change on the front way 14 equals:

14,763 − 3,363 = 11,400 in.lb.

This is a large change in moment and despite the rigidity of the way 14, this can cause an upward and downward tilting of the tip of the tool 22 with this change of position of the tools in the magazine 36.

FIG. 5 schematically illustrates the machine tool 11 as provided with the present invention with reference lines 61–64 the same as in FIG. 4. However, now the tool storage magazine 36 is pivoted to the slide 16 at the pivot 46 which is at a point along a vertical reference line 65 and the axis of screw 48 supporting the bulk of the weight of the magazine is at a vertical reference line 66. As shown in this FIG. 5 the screw 48 is slightly to the rear of the longitudinal center line 67 of the magazine 36 but is still connected to this magazine at a point 52 on the reference line 66 which is substantially at the center of gravity or center of mass of this magazine 36. Considering the FIG. 5 and assuming dimensions for an actual machine may be: $M = 5.56$ inches; $N = 31.81$ inches; $P = 36.4$ inches; $Q = 19$ inches; $R = 1.69$ inches; and $S = 1.6$ inches; two different conditions C and D are possible:

Condition C: With 300 pounds of tools all at the rear of the magazine 36 with center of mass at reference line 61:

The forces at the pivot 46 are as follows:

300 lbs. (5.56 inches + 31.81 inches + 36.4 inches −19 inches) = X(5.56 inches + 31.81 inches)

$x = 439.68$ lbs. force at support screw,
439.68 lbs. − 300 lbs. = 139.68 lbs. downward vertical force at point 46 on magazine 36.
Calculation for residual moment on way 7.25 inches × 139.68 lbs. − 1.69 inches × 139.68 lbs.
= 776.62 in.lb. clockwise Condition D: With all tools at the front of the magazine 36 with center of mass at reference line 62:

300 lbs. (5.56 inches + 31.81 inches −1.6 inches −19 inches) = X(5.56 + 31.81 inches)

$x = 134.63$ lbs. force at support screw,
300 lbs. − 134.63 lbs. = 165.37 lbs. upward vertical force at pivot 46 on magazine 36.
Calculation for residual moment on way 7.25 inches × 165.37 lbs. − 1.69 inches × 165.37 lbs.
= 919.46 in.lb. counter clockwise Moment change on front way 776.62 + 919.46 = 1696.08 in.lbs.

This is a moment change of 1696.08 in.lb. compared to 11,400 in.lb. in the prior art or a 6.7 : 1 improvement in the moment change by using the present invention.

The tool utilization mechanism 35 of the present invention thus provides a machine tool 11 with a tool storage magazine wherein the changing center of mass of the various tools and tool holders has far less effect on the precise positioning in space of the tool 22 than the prior art construction.

The second drive means 47 to raise and lower the tool storage magazine 36 includes the screw 48 and nut 49 and it also includes the toothed pulleys and timing belts 53 – 58. These toothed pulleys and timing belts not only transmit power to raise and lower the magazine 36 but also provide the means to sense the positioning of the first slide 16. The motor 25 still must provide sufficient power to lift both the slide 16 and the tool magazine 36, but the forward and backward tilting moments of the tool magazine, especially due to the changing position of the tool holders, has practically no effect on the tilting of the tool 22. Hence the entire machine tool 11 may be made to be much more accurate than previously.

Another advantage of the present invention is that the screw 48 and nut 49 even though a screw and ball nut combination, may be relatively cheaply constructed as a non-precision unit. The screw 27 and ball nut 30 will of course need to be a precision manufactured unit in order to precisely position the tool 22 as desired. However if the screw 48 and nut 49 were as much as 1/16 of an inch off from the desired position at some point along the vertical travel, this would have virtually no effect on the tool changer claw 43, because the pivot 46 is very close to the tool change position 41 at which tools are removed from and reinserted into the tool storage sockets 40. This 1/16 of an inch possible maximum deviation from the prescribed position would not affect the position of the tool holder by more than 0.005 inches, for example, and the tool changer claw 43 could easily enter the groove in the tool holder to properly grasp such tool holder. Another advantage of the present invention is that the pivot 46 and the reference line 65 is closely adjacent to the reference line 63, namely the axis of the screw 27. This keeps the change of moment small as the tool holders move from the front to the rear of the tool storage magazine.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a machine tool having a slide vertically movable on first and second ways on a base and power means connected through a first drive means to an actuation location on the slide to move the slide, the provision of a tool utilization mechanism comprising, in combination,
    a tool storage magazine having tool storage sockets adapted to receive different sizes of tools and movable in a path to change the center of gravity of the tool storage magazine,
    means mounting said magazine for vertical movement guided by the first and second ways and the weight of said magazine applying a load on the first and second ways which load varies in accordance with the position of said sockets in said magazine,
    second drive means connected between the power means and said tool storage magazine to move said tool storage magazine in a vertical direction,
    and said second drive means including means to effect vertical movement of said magazine substantially in accordance with the vertical movement of the slide.

2. A tool utilization mechanism as set forth in claim 1, wherein said magazine mounting means includes an interconnection between said magazine and the slide at a location closely adjacent a vertical reference line through the location of actuation of the slide by the first drive means.

3. A tool utilization mechanism as set forth in claim 2, wherein said interconnection is a pivotal interconnection and is the sole interconnection between the slide and said magazine to permit relative pivoting movements therebetween.

4. A tool utilization mechanism as set forth in claim 1, wherein the first drive means has substantially greater precision dimensions than said second drive means.

5. A tool utilization mechanism as set forth in claim 1, wherein each of the first and said second drive means includes screw and nut drives.

6. A tool utilization mechanism as set forth in claim 1, wherein the first drive means includes a rotatable screw and an axially movable nut, and said second drive means includes a rotatable nut and an axially movable screw.

7. A tool utilization mechanism as set forth in claim 1, wherein the first drive means includes a precision manufactured screw and ball nut and said second drive means includes a nonprecision manufactured screw and ball nut.

8. A tool utilization mechanism as set forth in claim 1, wherein said magazine mounting means includes means connecting said tool storage magazine to the slide in a position such that the center of gravity of said magazine is spaced horizontally from a vertical reference line of the first and second ways guiding movement of the slide.

9. A tool utilization mechanism as set forth in claim 1, including a chain engaging sprockets on said magazine,
    and said tool storage sockets being carried by said chain for storing toolholders with different sizes of tools therein to be movable to different positions to shift the total center of gravity of the toolholders, tools and tool storage magazine as the chain is moved.

10. A tool utilization mechanism as set forth in claim 1, wherein said second drive means includes linkage means interconnecting the first and said second drive means for concurrent movement.

11. A tool utilization mechanism as set forth in claim 10, wherein said linkage means includes a toothed wheel on the first drive means.
    a second toothed wheel on said second drive means,
    and means interconnecting said toothed wheels for concurrent rotation for both sensing the rotation of the first drive means and transmitting power to said second drive means.

12. A tool utilization mechanism as set forth in claim 11, wherein said toothed wheels are toothed pulleys, and said means interconnecting said toothed wheels is a toothed timing belt.

13. A tool utilization mechanism as set forth in claim 1, wherein said magazine mounting means includes means to connect said tool storage magazine at least on location to move in accordance with vertical movement of the slide.

14. A tool utilization mechanism as set forth in claim 13, wherein said connection means includes a pivotal connection between the slide and said tool storage magazine permitting vertical movement of said tool storage magazine relative to the slide.

15. A tool utilization mechanism as set forth in claim 13, including a tool changer connected to the machine tool to receive tools from and deliver tools into said magazine at a location closely adjacent said connection means.

16. A tool utilization mechanism as set forth in claim 1, wherein said second drive means is connected to said tool storage magazine at a location on a vertical reference line passing substantially through the center of gravity of said magazine.

17. A tool utilization mechanism as set forth in claim 16, wherein said magazine mounting means includes an interconnection means between said magazine and the slide at a location on a vertical reference line spaced from said center of gravity of said magazine.

* * * * *